Jan. 26, 1943.  B. C. ROEHRL  2,309,539
SPOOL CONSTRUCTION
Filed March 22, 1940

BRUNO C. ROEHRL
INVENTOR
BY
ATTORNEYS

Patented Jan. 26, 1943

2,309,539

UNITED STATES PATENT OFFICE 2,309,539

SPOOL CONSTRUCTION

Bruno C. Roehrl, Binghamton, N. Y., assignor to General Aniline & Film Corporation, Binghamton, N. Y., a corporation of Delaware Application March 22, 1940, Serial No. 325,417

4 Claims. (Cl. 242—70)

The present invention is concerned with a novel form of spool construction, and more particularly with a spool construction in which the customary end flanges are axially adjustable with respect to the core.

The older forms of spool construction which involved a core member and rigid end flanges attached thereto, suffered from certain disadvantages, particularly when such spools were used to hold photographic rollfilm. Such photographic rollfilm cartridges were ordinarily used for daylight loading in a suitable camera. However, it often happened that, either because of variations in the width of the film or in the spacing of the end flanges, the said flanges failed to press tightly against the edges of the film. Because of this looseness of engagement, it was possible for light rays to penetrate along the spool flanges and fog the edges of the film.

With these defects and disadvantages of the prior art in view, it is accordingly one object of my invention to provide a spool construction with at least one axially adjustable end flange.

A second object is to provide such a spool in which there are means for resisting axial separation of the spool flanges.

Another object is to provide such a spool, in which the spool core and end flanges have cooperating portions for producing a camming action which automatically resists such axial separation of the end flanges.

A still further object is to provide such a spool construction in which the automatic camming action is caused by the resiliency of the core portion of the spool.

Additional objects and advantages of my invention will be apparent from the following specification.

This invention accordingly comprises the construction and arrangement, certain forms of which are shown in the accompanying drawing forming a part of this specification, and in which Figure 1 shows one form of film spool (partly in section) made according to the invention;

In order that those skilled in the art may fully understand the nature and scope of the present invention, the following detailed and concise description thereof is given with particular reference to the attached drawing, wherein like reference characters indicate like parts.

Figure 2:
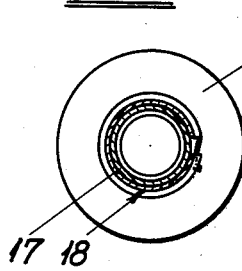
Figure 2 is a sectional view on the line 2—2 of Fig. 1.
Figure 1:
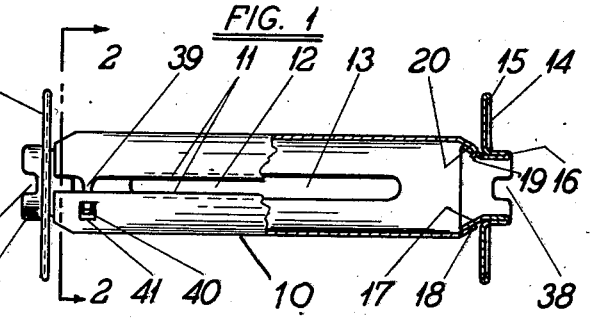

As shown in Figure 1, the film spool comprises a core portion 10 and suitable end flanges 14. The core 10 may advantageously be formed from a single sheet of material, which is bent around in the form of a cylinder or tube. The edges 11 of the blank from which the core is formed will accordingly face each other, as shown in the drawing, and will be slightly spaced apart to form the sides of a slot 12 which may serve as one of the film anchoring openings of the spool. The blank may also be provided with an oppositely disposed slit 13, which serves as the second customary film retaining opening.

The flanges 14 may have their outer edges rolled over as at 15 for the purpose of strengthening these flange portions. In the construction shown in Figure 1, these flanges 14 are stamped from a sheet of suitable material (for example metal) and may be formed in known manner so as to provide a hub portion 16.

The inner ends of this hub portion 16 are flared outwardly, as shown in the drawing, to form a substantially cone-shaped cam surface or cam portion 17. Cooperating with this cam portion 17 is the corresponding cam portion 18 formed on the core member 10. The cam surface 18 consists of inwardly flared edges on this core, which form a second cone-shaped cam portion cooperating with the surface 17 on the end flanges.

In order to prevent relative rotary movement between the core and flanges, any suitable means may be provided. The spool of Figure 1, for example, is formed with a lengthwise or axial slot 20 in the surface 17 of the spool flange and a struck-down tongue member 19 on the core portion, which fits in the slot 20 to prevent relative rotation of these two parts. Thus when the flanges are rotated by a suitable driving spindle cooperating with the notches 38 or other means on the flange hub 16, this rotation of the flanges will be communicated to the core portion and any material carried thereby.

In the preferred form of my invention, the core portion 10 is formed of resilient material which may be expanded or contracted diametrically, but which will tend to return to its original size because of the resiliency inherent in the material. Thus, in Figure 1, it will be obvious that, if some force is applied which tends to separate the end flanges 14 axially from each other, the cam surfaces 17 will act on the corresponding cam portions 18 to expand the central core portion 10. Such expansion of the core, however, will be resisted because of the resiliency of the core material and there will accordingly be a tendency for the core to contract to its original diameter, and, by reason of the cooperating cam surfaces 17 and 18, such contraction of the core will draw the spool flanges axially toward each other and restore them to their original positions if permitted to do so.

In order to prevent expansion of the core 10 to such an extent that the flanges could become completely disengaged from the core, I have provided means to limit such expansion. Thus the core may have a slot 41 near one of the abutting edges 11. The other edge carries on extending tongue 39, provided with an upturned lug 40 extending into said slot. The lug cooperates with the slot to limit the maximum expansion of the core 10. Thus there is no danger of accidental disengagement of the core and flanges. Other suitable limiting means, equivalent to the foregoing, may obviously be provided.

Figure 3:
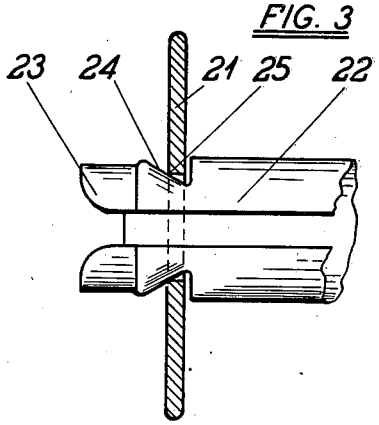
Figure 3 is a view (with the flange shown in section) of a second form of spool construction made according to the invention.

In Figure 3, I have shown a second modification of my invention, in which the flanges 21 are formed from flat metal disks with an opening at the center, but with no substantial hub portion as in the construction of Figure 1. The core member 22 in this second form of construction is again formed of resilient sheet material bent in the form of a cylinder or tube, but, in this case, the flange 21 fits over the outside of the core 22 rather than within such core as in Fig. 1. The core is provided with suitable extensions 23 for engaging with any desired winding device. The core is further provided with the axially tapered cam portion 24 which, again, may be in the form of a cone-shaped region. This cam area 24 fits within the central opening of the flange 21 and acts against the edges 25 of this inner opening in the flanges.

It will be apparent that, in this form of construction, an axial separation of the flanges 21 will cause the core to contract rather than to expand, as was the case in connection with Figure 1. This contraction of the core 22 is caused by the action of the inner flange surfaces 25 on the cam portions 24 of the core. Because of the resilient nature of the core, this axial separation of the flanges 21 will be automatically resisted, and the core will tend to expand and draw the flanges together to their original positions.

Figure 4:
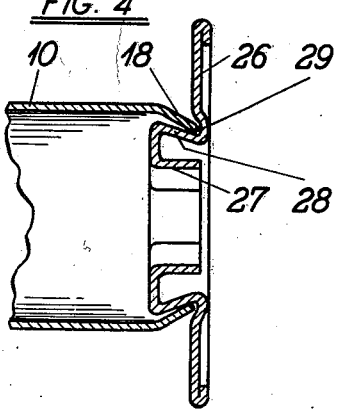
Figures 4 to 6 are sectional views of other modifications of my novel spool construction.

In Figure 4, I have shown another form of construction in which the core 10 is identical with that shown in Figure 1 and is provided with the inwardly turned cone-shaped cam portions 18. The flange 26 is formed from the desired material and is provided with an inner hub portion 27 and a cone-shaped cam surface 28. In this modification of my invention, however, the cam surfaces 18 and 28 are formed at different angles with respect to the axis of the film spool. As a result, these cam surfaces do not touch each other throughout their length but make contact at a single point 29. It will be understood that, since the cam surfaces are substantially circular in cross-section, this "point of contact" 29 will really extend all around the cam surfaces in the nature of a circle and will form a single line or edge-like contact. The advantage of this form of construction is that the frictional resistance between the two cam surfaces is greatly reduced so that the efficiency of the camming action is increased.

Figure 5:
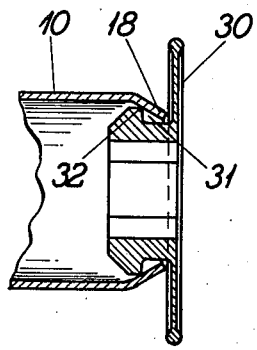

In Figure 5, another method of obtaining such a "line contact" is shown. Here, again, the core 10 with its inwardly formed cam surface 18 is the same as the core of Figure 1. The flange 30, however, is formed of solid material and is integral with its central hub or bearing portion. Instead of providing this flange with an angular cam surface as in the preceding cases, the portion of the flange adjacent the end of the core is cut back slightly as at 31 to leave a single projecting portion 32 in contact with the cam surface 18. Here again, the single line of contact between these two parts "core and flange" serves to reduce friction and improve the efficiency of the spool.

Figure 6:
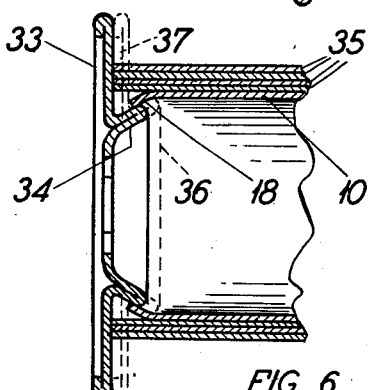

In Figure 6, I have shown a spool made according to my invention, on which several turns of film or other sheet material have been wound. The core portion 10 with its cam surface 18 is the same as the core of Figure 1. The flanges 33 are similarly provided with angular or cone-shaped cam surfaces 34. In this figure, the film 35 which has been wound on the core portion, is of greater width than the normal spacing of the two end flanges 33 (of which only one is shown in the drawing). Because of the greater width of the film 35, there is a tendency to force the end flanges 33 apart to the position shown in heavy lines in the figure. This naturally, causes an expansion of the core portion 10, as shown in the drawing. Because of the resiliency of the core portion, however, and also because of the contracting force of the successive turns of film, there is a tendency to contract the core portion to its original position, and thereby move the end flange 33 back to its normal position, as shown in dotted lines at 36 and 37. This tendency to draw the spool flanges axially toward each other causes the flanges to be pressed tightly against the edges of the film 35 wound on the spool and thereby prevents any light rays from penetrating along the spool flanges to the edges of the successive film layers. As explained above, such a close and light-tight fit is particularly desirable when the sheet material or film 35 is a light-sensitive photographic film.

It should be noted in connection with Figure 6 that, in the forms of construction where the cam surfaces of the core are on the outside of the cam surfaces of the flanges (Figs. 1, 2, 4, 5, and 6), the invention will be operative even though the core portion is not made of resilient material but is merely somewhat flexible. In such a case, any axial separation of the spool flanges due to the greater width of the film will tend to expand the flexible core. As successive turns of film are wound on the core, however, these film layers will exert a contracting force on the core and will tend to restore it to its original diameter. Thus, after a few turns of film have been wound onto the spool, the cooperative camming action between the surfaces on the core and flange will urge the flanges toward each other and will bind them tightly against the edges of the film.

In general then, it will be apparent that my invention includes the broad idea of a film spool construction in which the end flanges are axially adjustable but tend to be restored automatically to their original relative position. Obviously a single end flange could be made adjustable in this manner, while the other flange could be rigidly joined to the core portion, without departing from the basic principles of my invention. This invention is, therefore, not to be limited in scope to the precise forms of construction shown in the drawing, but is to be interpreted as covering broadly all equivalent forms of construction within the scope and spirit of the appended claims.

Now therefore I claim:

1. A flanged spool comprising a resilient core and an end flange thereon, axially adjustable to effect tight contact with core-wound material, one of said members having an aperture therein, a head on said other member projecting through said aperture, said head having a diameter greater than the diameter of said aperture to prevent disengagement of said flange from said core and cooperating cam surfaces on said resilient core and said flange permitting limited axial movement of said flange while resisting axial separation of the flanges.

2. The apparatus as defined in claim 1 wherein said head is located on said adjustable flange and the core is provided with said aperture.

3. The apparatus as defined in claim 1 wherein said head is located on said core and said adjustable flange is provided with the aperture.

4. The apparatus as defined in claim 1 wherein means are provided on said core portion to limit the maximum expansion of said core portion.

BRUNO C. ROEHRL.